United States Patent

Maserjian et al.

[15] 3,676,754
[45] July 11, 1972

[54] THIN-FILM TEMPERATURE SENSOR AND METHOD OF MAKING SAME

[72] Inventors: Joseph Maserjian; John R. Gatewood, both of La Crescenta, Calif.

[73] Assignee: The United States of America as represented by the Administrator of the National Aeronautics and Space Administration

[22] Filed: July 13, 1971

[21] Appl. No.: 162,230

[52] U.S. Cl. ................................ 317/230, 29/570, 317/261
[51] Int. Cl. ........................................................ H01g 9/05
[58] Field of Search ........................ 317/230, 231, 232, 233

[56] References Cited

UNITED STATES PATENTS

| | | |
|---|---|---|
| 3,320,484 | 5/1967 | Riley et al. ............................ 317/230 |
| 3,456,112 | 7/1969 | Webb .................................... 250/83 |
| 3,473,096 | 10/1969 | Jahnson et al. ........................ 317/261 |
| 3,568,010 | 2/1971 | Maserjian ............................. 317/230 |

Primary Examiner—James D. Kallam
Attorney—John R. Manning, Wilfred Grifka and Monte F. Mott

[57] ABSTRACT

A thin-film temperature sensor for fast response is disclosed, formed on a foil of tantalum using a self-supporting oxide of the foil as a substrate and using vapor-deposition techniques to deposit a temperature-sensitive capacitor having a dielectric material sandwiched between layers of aluminum which serve as capacitor electrodes. An insulation layer of $SiO_2$ is deposited before the outer electrode, except over the active region of the capacitor, and a passivation film of $Al_2O_3$ is deposited over the entire device except an area where a lead is soldered to the outer electrode. The entire assembly is coated with Parylene C.

18 Claims, 2 Drawing Figures

PATENTED JUL 11 1972

3,676,754

JOSEPH MASERJIAN
JOHN R. GATEWOOD
INVENTORS

BY
Lindenberg, Freilich & Wasserman
ATTORNEYS 3,676,754

THIN-FILM TEMPERATURE SENSOR AND METHOD OF MAKING SAME

ORIGIN OF THE INVENTION

This invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to a thin-film capacitive sensor to be used for measuring the rapid temperature changes of, for example, fluid streams, and to a method of producing it on a self-supporting film of tantalum oxide.

In the past, technology has been developed for producing thin-film capacitive bolometers for use in space or a vacuum as described in U.S. Pat. No. 3,456,112 titled Temperature-Sensitive Capacitor Device and U.S. Pat. No. 3,568,010 titled Thin-Film Capacitive Bolometer and Temperature Sensor.

In the first of those two patents, a temperature-sensitive capacitive device is produced in the form of a sandwich of two metal electrodes with a thin film of material between them which displays dielectric properties in zones near the electrodes. The dielectric employed was titanium dioxide ($TiO_2$). The sandwich was produced on a substrate of mica using aluminum for the electrodes. The film of dielectric material purposely contained a high level of ionized impurities, typically at least a tenth of 1 percent and a maximum of a few per cent of ionized aluminum oxide, or oxygen vacancy impurities dispersed from the electrodes into the titanium-dioxide film in the process of fabrication.

This technology for producing a thin-film capacitive bolometer on a mica substrate is an attractive possibility for a thin-film temperature sensor of general utility if properly adapted for the purpose. It offers good temperature sensitivity at room temperature and is ideal for use as a fast-responding temperature sensor. However, a need exists for a fast-responding temperature sensor having good temperature sensitivity for use in fluid streams undergoing rapid changes of temperature. In some applications the fluids may be corrosive solutions so that such a temperature sensor may not be used successfully, but for very short periods, even if flow rates are not sufficient to damage the sensor mechanically. Moreover, when the solution is an electrical conductor, such a device cannot be used without some form of electrical insulation that would detract from the temperature sensitivity of the sensor.

The second technique for fabricating thin-film temperature sensors described in the U.S. Pat. No. 3,568,010 employs an aluminum foil over a hole in the titanium frame. The aluminum foil is electro-polished to produce a smooth surface and then selectively anodized to produce a thin film of $Al_2O_3$ over which the device is produced using niobium (Nb) vapor deposited on the anodized aluminum film. The deposited niobium overlaps the anodized aluminum film to make direct electrical contact with the bare aluminum film. The niobium is then anodized to produce an oxide film ($Nb_2O_5$) as the dielectric material for the device. A nickel strip is deposited over the oxide film to provide the second electrode of the thin-film capacitive bolometer. The first electrode is the niobium film. A protective overcoat of $Al_2O_3$ is vapor-deposited on the entire device except where electrical contact is to be made with the nickel. The aluminum foil on the titanium frame supports the device while it is being fabricated over a film of $Al_2O_3$. Once the protective overcoat has been deposited, the aluminum foil beneath the device is removed through the hole in the titanium frame. The exposed $Al_2O_3$ film then serves as the only supporting substrate for the device.

A variant of this technique described in the U.S. Pat. No. 3,568,010 is with a niobium foil in place of an aluminum foil. An oxide film ($Nb_2O_5$) produced on the film then serves as the dielectric while the niobium foil serves as the substrate and first electrode. A nickle strip is deposited on the oxide film to serve as the second electrode.

In practice, many thin film capacitive bolometers would be produced simultaneously on a frame having many holes, and the corresponding electrodes would be interconnected, again using standard thin-film techniques to provide a number of sensors connected in arrays for use in a particular application.

SUMMARY OF THE INVENTION

An object of this invention is to provide a fast-responding temperature sensor of the thin-film capacitor-type which can withstand contact with various corrosive fluids and can withstand both high fluid flow rates and the turbulence caused by rapid changes in flow rates. Another object is to provide a method of readily producing such a temperature sensor with reliable characteristics.

The foregoing and other objects of the invention are achieved by providing a self-supporting anodized tantalum ($Ta_2O_5$) window on a tantalum foil and a temperature-sensitive capacitor on the window. The sensor is comprised of a dielectric layer sandwiched between aluminum films which serve as electrodes. To increase breakdown voltage and reduce leakage, thin layers of $Al_2O_3$ (about 50 A.) may be interlayered between the dielectric layer layer and the aluminum electrodes. An $Al_2O_3$ passivation layer of the entire structure on the side opposite the tantalum foil, except over one small area on which a lead is soldered to the upper electrode of the capacitor at a location outside the active area of the capacitor. The soldered connection is protected by an epoxy seal, and the entire assembly is coated with a continuous polymer film.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
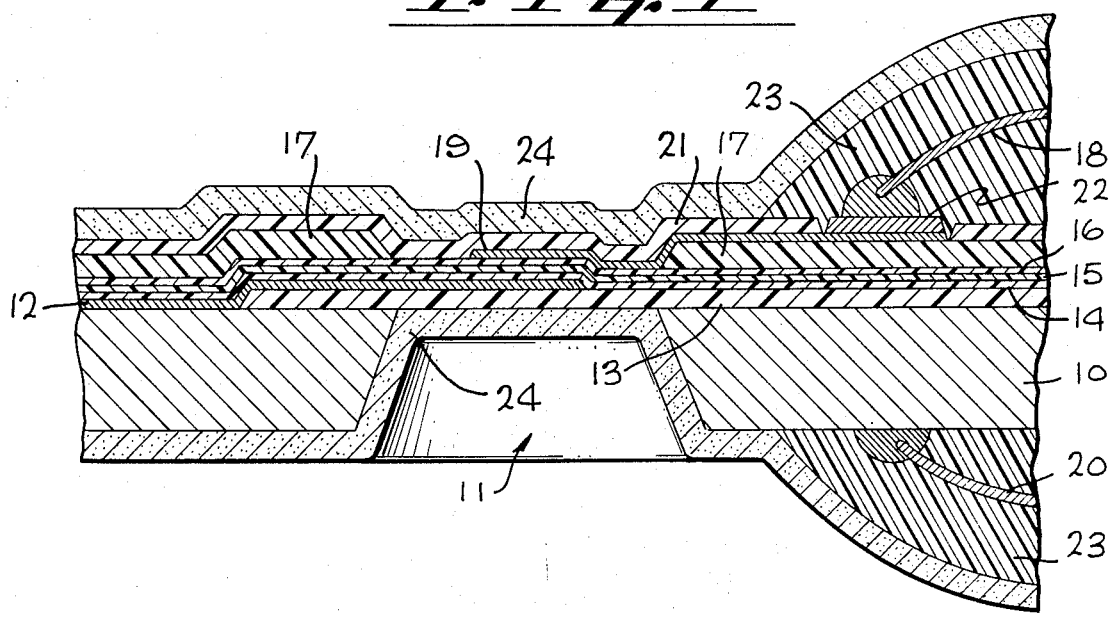
FIG. 1 is a sectional view of a temperature-sensitive capacitor on a tantalum foil according to the present invention.

Referring now to FIG. 1, a temperature-sensitive capacitor is provided according to the present invention on a tantalum foil 10 about 0.001 inch thick. The purity and condition of the tantalum foil is important in obtaining a clearly etched window 11. Good results have been obtained by using commercially pure tantalum foil (99.8 percent pure) and baking the foil in a vacuum at high temperatures over 2,000° C. for about 10 to 15 minutes. It is believed that this vacuum baking removes impurities and anneals the tantalum foil to permit reliable etching of the window.

Once the foil has been vacuum-baked, the substrate for the temperature-sensitive capacitor is prepared. The entire back surface (lower side as viewed in the drawings) and portions of the front surface are first masked using a suitable photoresist, such as Kodak AZ1350. The mask covers an area to the used for a first electrode 12 in contact with the foil 10. The front (upper) surface not covered by the mask is then anodized in 3 percent tartaric acid at 0.5 ma/cm² to 100 volts to form a $Ta_2O_5$ anodic film 13. The back surface of the foil is masked during anodization to allow electroetching of the tantalum foil 10 from that side to form the window 11 as part of the final fabrication and assembly process.

After the anodization, the mask material is removed using acetone, and the foil is trimmed, cleaned and aligned in an evaporation holder in preparation for deposition of capacitor elements. The process for depositing these thin-film elements employs standard evaporation techniques. An aluminum film is deposited to form the first electrode 12. That is done by first baking the anodized foil in a vacuum at 200° for 15 minutes and then vapor-depositing the aluminum electrode film to a thickness of about 400 A. at 100° C. This film extends from the exposed upper surface of the tantalum foil over the anodic film to a point past the center of the window 11.

Without ever removing the foil from the vapor-deposition chamber, a thin film 14 (about 50 A.) of Al$_2$O$_3$ is deposited at 100° C. Then a layer 15 of an oxide material, preferably zirconium dioxide (ZrO$_2$), is vapor-deposited at 200° C. by electron bombardment to form the primary dielectric layer of the capacitor. Other oxide materials (Nb$_2$O$_5$, Ta$_2$O$_5$, Al$_2$O$_3$ and TiO$_2$) have been successfully used with thicknesses ranging from 100 to 400 A. and with various substrate temperatures, but ZrO$_2$ was found to yield more consistent and better characteristics in performance, and good electrical stability. Another thin film 16 (about 50 A.) of Al$_2$O$_3$ is deposited at 200° C. on the layer of oxide material to complete the dielectric layer of the capacitor. The entire assembly thus far produced is then annealed in a vacuum at 250° C. for one hour to help stabilize capacitor characteristics.

The evaporated Al$_2$O$_3$ films are preferably obtained using sapphire pellets as the source material. The ZrO$_2$ is preferably evaporated from pellets of compressed ZrO$_2$ powder (99.99 percent pure). Best results from the ZrO$_2$ layer were obtained when the evaporation rate was less than 1 A./sec with the substrate at about 200° C.

It should be noted that the dielectric layers of Al$_2$O$_3$ and ZrO$_2$ sandwiched between aluminum films may be deposited over the entire substrate. A rotating mask assembly and multiple-source electron-gain are used to permit deposition of these and other layers without opening the vacuum system.

A layer 17 of silicon-dioxide SiO$_2$ is deposited (using fused quartz as a source) over the upper surface of the assembly, except over the window 11, to reduce stray capacitance outside the active area of the capacitor being formed in the window, and to provide additional insulation for the process of soldering a lead 18 to the second electrode of the capacitor formed by depositing an aluminum film 19 from a point to the left of center in the window area to an area on the SiO$_2$ film where the lead is to be soldered. A second lead 20 may be soldered directly to the tantalum foil to complete the circuit to the first electrode 12 of the capacitor. The SiO$_2$ is deposited to about 2,000 A. at 200° C. and then the aluminum film 19 is deposited to about 400 A. at 100° C. That film is preferably smaller in width than the first electrode film 12 in the window area to define the effective size of the capacitor where the two overlap. An outer passivation layer 21 of Al$_2$O$_3$ is deposited to about 1,000 A. at 100° C., except over the area where the lead 18 is to be soldered to the second electrode 19. A film 22 of silver (Ag) is deposited to about 1,000 A. over that soldering area. The entire assembly thus far produced is then removed from the vacuum-deposition chamber and tested.

In practice, many capacitors are produced simultaneously over a pattern of window areas. These capacitors are then cut into individual or several devices. Assuming individual devices are desired, the cut-out element is accurately positioned in a jig (not shown) for the step of electroetching the window 11 through the tantalum foil 10 to the anodic (Ta$_2$O$_5$) film 13. Etching of a circular window of about 0.015 in. diameter is completed in about five minutes. After soldering the leads 18 and 20, the device is mounted on a suitable probe assembly (not shown). In place of the lead 20, the tantalum foil of the device may be mounted and welded to a conductive outer sheath of the probe assembly which then serves as the grounded second electrical connection. The lead or leads may be soldered using a eutectic of indium and tin, and sealed with epoxy 23. After further inspection and test, the entire assembly is coated with a continuous pinhole-free film 24 of Parylene C, a thermoplastic film polymer (poly-monochloro-para-xylylene).

Figure 2:
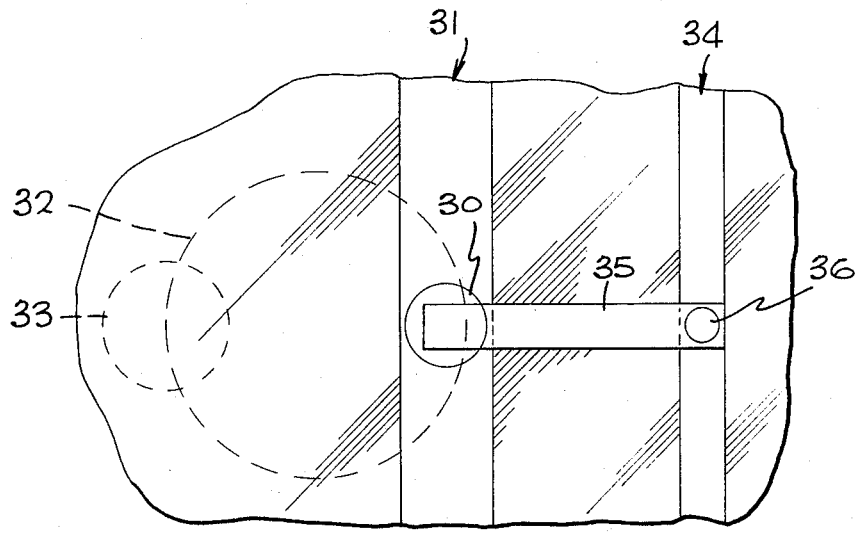
FIG. 2 is a diagrammatic representation of the topology for one of an array of temperature sensitive capacitors produced on a tantalum foil.

To produce one of many thin-film temperature sensors simultaneously on a foil of tantalum in an array, the topology shown schematically in FIG. 2 may be used. A full line circle 30 represents the window 11 in the tantalum foil 10, and the vertical, unshaded strip 31 passing over the window represents an opening in the silicone dioxide film 17. A large dotted line circle 32 overlapping the window represents the aluminum contact 11 deposited over the anodized tantalum (Ta$_2$O$_5$) film 13 formed on the tantalum foil except in the area of a smaller dotted line circle 33 which provides electrical contact between the aluminum film 12 and the tantalum foil in the area where the circles 32 and 33 overlap.

A second unshaded vertical strip 34 represents an opening in the top film 21 of Al$_2$O$_3$ through which a layer 22 of silver is deposited on the second aluminum electrode 19. The latter is represented by a solid line rectangle 35, and the former by a solid line circle 36 in that area where the rectangle 35 overlaps the vertical strip 34.

Since the two vertical strips 31 and 34 extend over the entire tantalum foil, the patter shown in FIG. 2 may be repeated to produce a number of sensors in a column. Additional vertical strips may be provided to the left and right for additional columns of sensors. The structure is cut into sections of one or more sensors before the electrical connections are made and sealed with epoxy. When the electrical connections have been made, and sealed, the assembly is coated with Parylene C.

From the foregoing, it may be appreciated that the preparation of the tantalum foil substrate is an important part of the present invention for it provides a thin-film support for the capacitor. The tantalum foil and the anodic (Ta$_2$O$_5$) film substrate across the etched window offer excellent resistance to corrosion by fluids. Moreover, the anodic film of tantalum offers the advantage of greater film strength, and can be formed by a more controllable electroetching procedure from the tantalum foil than other material, such as aluminum. The high-temperature vacuum bake was found to be important in preparing the tantalum foil for anodizing and etching the window. Erratic etching results were obtained before the vacuum bake procedure was incorporated in the process.

The thin-film sensor (about 1,300 A. exclusive of the Al$_2$O$_3$ and Parylene C coating) produced on the anodic film (about 1,500 A.) has been found to be very sensitive to temperature. The temperature dependence of the capacitor can be described in terms of the temperature coefficient $\alpha$, defined by $$\alpha = \frac{1}{C}\frac{d\,C}{d\,T} \qquad (1)$$

where $C$ is the capacitance and $T$ is the absolute temperature. It has been shown that a relatively large $\alpha$ can be obtained with thin dielectric films which contain sufficient ionic charge because of the effect of electron trapping. A general relationship that applies when DC leakage and series resistance can be neglected is given by $$\alpha Q = (2/\pi T) \ln(\omega_0/\omega) \qquad (2)$$

where $Q$ is the quality factor of the capacitor (or 1/dissipation factor), $\omega$ is the angular frequency, and $\omega_0$ is a parameter depending on properties of the dielectric film (typically on the order of $10^{13}$ sec$^{-1}$). The fundamental significance of the $\alpha Q$ product can be seen by considering a method of converting a capacitance change into an output voltage.

When employed in a standard resonant bridge circuit, the thin-film temperature sensor provides an ac voltage output of amplitude V for a given temperature change $\Delta T$ given by $$V = V_0 \alpha Q \Delta \Delta T, \qquad (3)$$

where $V_0$ is the amplitude of the harmonic voltage applied across the capacitive element. If low-loss coils L are used in parallel with the temperature sensor, and a similar reference temperature sensor in the bridge, the circuit $Q$ is determined only by the capacitive elements, namely, $$Q = \omega RC. \qquad (4)$$

where $R$ and $C$ are the parallel equivalent resistance and capacitance of the sensor at the frequency $\omega$. It has been shown that the $Q$ remains nearly constant over a wide range of frequencies (i.e., $R \approx 1/\omega$). The importance of $\alpha Q$ is seen by Eq. (3) to determine the temperature sensitivity of the transducer. The applied voltage $V_0$ is limited to the maximum value at which conduction losses in the capacitive element becomes significant.

The resonant bridge circuit gives an output voltage larger by the factor $Q$ than from a simple capacitance bridge without coils. The resonance also increases the Nyquist noise at the bridge output by the same factor, but the larger response and higher output impedance means less degradation in sensitivity from amplifier noise. This advantage also applies to other possible circuits which make use of resonance. Another example would involve an FM output from a tuned oscillator incorporating a capacitive element.

The temperature sensor described and illustrated may be used in many applications, such as monitoring temperature in a gaseous flow or a liquid flow. In the case of gaseous flow, only the passivation layer 21 of $SiO_2$ may be required to maintain the integrity of the sensor. For monitoring liquid flow, particularly of corrosive solutions, such as in biochemical reactions, the film 24 of polymer is preferred, in which case the passivation layer 21 would not be required. However, such a passivation layer protects the sensor while handling until the polymer coating is applied.

The preferred polymer coating is one developed and sold by Union Carbide Corporation as Parylene C, a member of a polymer series. The basic member, called parlene N is p-xylylene, a completely linear, highly crystalline material. Parylene C is produced from the same monomer modified only by the substitution of a chlorine atom for one of the aromatic hydrogens. The structure is as follows:

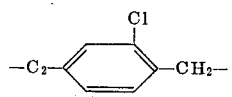

To provide a pinhole-free conformal coating, Parylene C is deposited from the vapor phase by a process which resembles vacuum deposition of metals, except that the vacuum used is only about 0.1 torr so that the mean free path of the gas molecules in the deposition chamber is in the order of 0.1 cm and all sides of the sensor to be coated are uniformly impinged by the gaseous monomer.

The solid dimer is first vaporized at about 250° C. Then the quantitative cleavage (pyrolysis) of the dimer at the two methylene-methylene bands at about 680° C. to yield the stable monomeric diradical, p-xylene. Finally, the monomer is passed into the deposition chamber where is simultaneously adsorbs and polymerizes on the substrate at room temperature. Traps protect the vacuum pump from the monomer. The deposition of Parylene C is normally at about 0.5 microns per minute.

Other techniques employed are standard and well known, including the very important steps of vacuum baking the tantalum foil, and anodizing the foil on one side to provide a substrate of $TaO_2$. Annealing the dielectric layer at 250° C. is also important as it was found to help stabilize the capacitor characteristics. The step of electro-etching the window is also standard. It is done by placing the window area over a 0.001 inch diameter cathode (Pt) in a quartz capillary tube gravity fed at the bottom with a 5 % $NH_4Cl$ solution in methanol. The capillary tube then feeds the solution up to the window area over the cathode while 0.5 milliamps of current is conducted through the foil mode. The etching of a window about 0.015 inches in diameter is normally completed in about 5 minutes.

These techniques provide a new device for sensing small and rapid temperature changes. Rapid thermal response is assured by supporting the thin-film capacitor structure on a thin anodic $TaO_2$ film left suspended across an electrolytically etched window in the tantalum foil. Accordingly, the steps of anodizing and electroetching are important, although carried out in accordance with standard techniques.

While a particular embodiment of the invention has been described, many modifications and variations therein may be restored to, particularly in the geometry of the deposited films shown in FIG. 2, or in the process steps without departing from the teachings of the invention. Accordingly, it is not intended that the scope of the invention be determined by the disclosed exemplary embodiments, but rather should be determined by the breadth of the appended claims.

What is claimed is:

1. A thin-film temperature sensor comprising a capacitor including
    a tantalum foil,
    a thin film of anodic tantalum oxide forming a substrate on one side of said foil,
    a first thin film of metal deposited on said substrate forming a first electrode of said capacitor,
    a thin layer of dielectric material deposited over said first electrode,
    a second thin film of metal deposited on said layer of dielectric material, said second film overlapping said first thin film of metal over an area thereof and forming; a second electrode of said capacitor, and
    a window etched through said foil from the side thereof opposite said one side to expose said substrate over an area which includes the area wherein said first and second thin films of metal overlap.

2. A thin-film temperature sensor as defined in claim 1 including an oxide insulation layer over said thin film of dielectric material except over the area of said window.

3. A thin-film temperature sensor as defined in claim 2 including a polymer coating on the entire surface thereof.

4. A thin-film temperature sensor as defined in claim 2 wherein said substrate is on said foil uniformly except over a first area remote from said window wherein said foil is exposed and said first thin film of metal is deposited in a continuous film over said area remote from said window for making an electrical connection with said first electrode of said capacitor through said foil, and said second thin film of metal is deposited in a continuous film over said oxide insulation layer to adjacent a second area remote from said window, and wherein an electrical lead is connected to said second thin film of metal at said second area.

5. A thin-film temperature sensor as defined in claim 3 including an oxide passivation layer underneath said polymer coating on the entire surface opposite said foil except over said area having an electrical lead connected thereto.

6. A thin-film capacitor for measuring the temperature of fluids, said capacitor being encapsulated in a layer of polymer and comprising
    a foil of tantalum,
    said foil having a substrate consisting of a thin film of anodic tantalum oxide on one side of said foil and a first contact area of the foil surface
    a window through said foil to said substrate over a predetermined area of the substrate,
    a first capacitor electrode consisting of a continuous thin metallic film over a substantial part of said predetermined area and said first contact area,
    a dielectric layer over said substrate and said first electrode,
    an electrical insulation layer over said dielectric layer exclusive of the area over said predetermined area,
    a second capacitor electrode over said dielectric layer consisting of a thin metallic film over a substantial part of said predetermined area overlapping said first electrode, and over said insulation layer, and including a second contact area, and
    an electrical lead connected to said second contact area.

7. A method of producing a thin-film temperature sensor comprising the steps of
    baking a tantalum foil in a vacuum,
    anodizing one surface of said foil for providing a substrate film of anodic tantalum oxide thereon for the dielectric of for a thin-film capacitor, vapor depositing on said substrate a first film of conductive metal for one electrode of the thin film capacitor, said first film of conductive metal covering a substantial part of a predetermined area of said substrate, vapor depositing a thin layer of dielectric material over said first film of conductive metal in said predetermined area, vapor depositing a second film of conductive metal overlapping said first film in said predetermined area for a second electrode of and establishing the size of said capacitor, etching a window through said foil to said substrate in said predetermined area, making electrical connections to said first and second films, and sealing the assembly with a protective coating.

8. A method as defined in claim 7 wherein said step of vapor depositing said dielectric material is followed with a step of annealing the deposited dielectric material before depositing said second film of conductive material.

9. A method as defined in claim 7 wherein the step of sealing comprises coating the assembly with a polymer on all sides.

10. A method as defined in claim 7 wherein the step of sealing the assembly comprises applying a film of $Al_2O_3$ for a passivation layer over films on said substrate.

11. A method as defined in claim 10 wherein said step of sealing the assembly with said protective coating includes depositing a film of polymer on all sides.

12. A method as defined in claim 7 wherein said step of vapor depositing said dielectric material comprises depositing a layer of $ZrO_2$.

13. A method as defined in claim 12 which comprises applying a thin film of $Al_2O_3$ on each side of said $ZrO_2$.

14. A method as defined in claim 13 which comprises annealing said layer of dielectric material before depositing said second film of conductive material.

15. A method as defined in claim 7 which comprises depositing a layer of $SiO_2$ for a protective layer over said layer of dielectric material, except over said predetermined area of said substrate, before depositing second film of conductive material.

16. A method as defined in claim 15 wherein said step of sealing the assembly with a protective coating includes depositing a film of polymer on all sides.

17. A method as defined in claim 15 wherein said step of sealing the assembly with said protective coating includes depositing a film of $Al_2O_3$ for a passivation layer over films on said substrate.

18. A method as defined in claim 17 wherein said step of sealing the assembly with said protective coating further includes depositing a film of polymer on all sides.

* * * * *